United States Patent [19]

Nicholson et al.

[11] Patent Number: 4,590,540

[45] Date of Patent: May 20, 1986

[54] CIRCUIT BOARD MOUNTING ARRANGEMENT

[75] Inventors: John E. Nicholson, Indianapolis, Ind.; William A. Gilbert, Hialeah, Fla.

[73] Assignee: RCA Corporation, Princeton, N.J.

[21] Appl. No.: 609,415

[22] Filed: May 10, 1984
(Under 37 CFR 1.47)

[51] Int. Cl.[4] .............................................. H05K 1/18
[52] U.S. Cl. ..................................... 361/400; 70/345; 339/75 R; 339/91 L; 358/254; 361/423
[58] Field of Search ............... 361/400, 423; 358/254; 339/17 D, 75 T, 91 L; 70/345

[56] References Cited

U.S. PATENT DOCUMENTS

| | | | |
|---|---|---|---|
| 1,325,189 | 12/1919 | Carter | 70/345 X |
| 2,889,479 | 6/1959 | Brown | 313/84 |
| 3,407,717 | 10/1968 | Ernisse | 339/91 L |
| 3,616,733 | 11/1971 | Morse | 339/91 L X |
| 3,770,889 | 11/1973 | Gutschick et al. | 178/7 |
| 3,944,892 | 3/1976 | Johnson et al. | 358/254 X |
| 4,054,346 | 10/1977 | Schultz | 339/75 T |
| 4,065,198 | 12/1977 | Jordan | 339/17 D |
| 4,165,143 | 8/1979 | Puhak | 339/75 |
| 4,338,635 | 7/1982 | Haider et al. | 358/254 |
| 4,402,037 | 8/1983 | Iwamaura et al. | 361/423 |

Primary Examiner—R. R. Kucia
Attorney, Agent, or Firm—Paul J. Rasmussen; Joseph Laks; Stevens, Scott J.

[57] ABSTRACT

A mounting arrangement for a circuit board on the neck of a cathode ray tube includes a guide member formed in the cathode ray tube base. The guide member is formed to have a surface extending perpendicular to the tube longitudinal axis. The circuit board incorporates a socket having a channel for receiving the guide member for aligning the socket on the tube base. A portion of a locking piece is inserted through a hole in the socket wall in order to abut the perpendicular surface of the guide member to prevent removal of the socket from the tube base. A second portion of the locking piece forms a hook which cooperates with the socket to prevent inadvertent removal of the locking piece.

6 Claims, 9 Drawing Figures

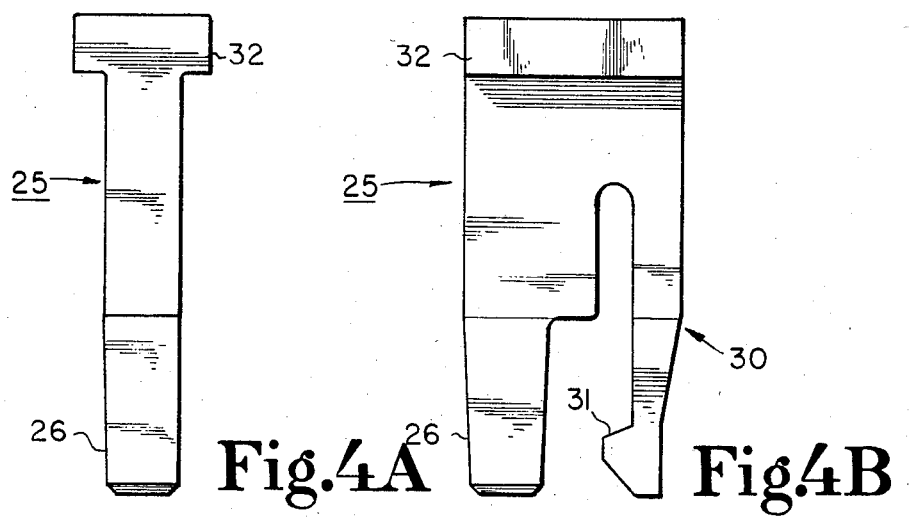
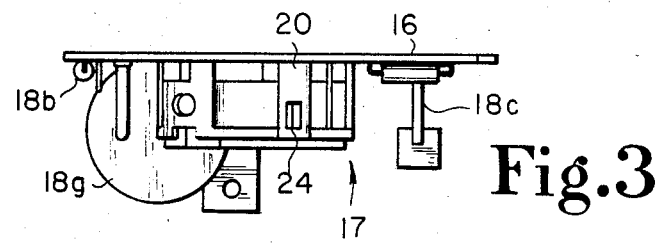
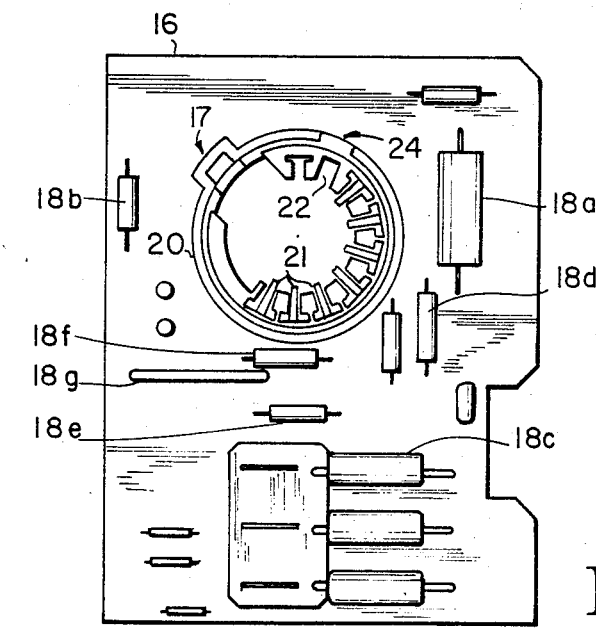

CIRCUIT BOARD MOUNTING ARRANGEMENT

This invention relates to mounting and retention systems for printed circuit boards and, in particular, to an arrangement for mounting a circuit board on the neck of a cathode ray tube.

A video display apparatus, such as a television receiver or computer monitor, normally has the printed circuit board with the cathode ray tube or kinescope driving circuitry mounted to the neck of the tube via an electrical socket which makes electrical contact to the electron gun assembly via the electrical terminal base of the cathode ray tube. This circuit board may also include a high voltage surge arrestor, or spark gap.

It is important that good electrical contact be maintained between the circuit board socket assembly and the connections on the cathode ray tube base. During packing, shipment and unpacking of the video display apparatus, movement and vibration may cause the tube mounted circuit board to become dislodged or fall off, resulting in the video display apparatus being inoperative.

In order to secure the circuit board on the tube neck, it is known to fasten the board to another component, such as the deflection yoke, by the use of a plastic strap or cable. Although this holds the circuit board in position, tension on the plastic strap during assembly, or vibration from shipping may cause misalignment of the deflection yoke, thereby deteriorating the performance of the video display apparatus. This is particularly undesirable with computer monitors, where the positioning of the deflection yoke is extremely important.

In accordance with the present invention, a mounting arrangement for a circuit board comprises a cathode ray tube having a tube base incorporating a guide member extending parallel to the longitudinal axis of the cathode ray tube and having a forward-facing surface extending substantially perpendicular to the tube longitudinal axis. A socket is mounted on the circuit board and has a cylindrical wall structure. A portion of the wall has a channel formed in it for receiving the tube base guide member to permit alignment of the socket with the tube base. That portion of the socket wall structure has a passage formed through it. A locking piece has a first part that is insertable through the passage and abuts the guide member forward-facing surface to prevent removal of the socket from the tube base. The locking piece has a second part with a hook that cooperates with the interior surface of the socket wall structure to prevent inadvertent removal of the locking piece.

In the accompanying drawing, FIGS. 1A and 1B are elevational views of a portion of a cathode ray tube, illustrating the tube base;

FIG. 2 is a front elevational view of a circuit board and socket assembly for mounting on the cathode ray tube shown in FIG. 1;

FIG. 3 is a top plan view of the circuit board and socket assembly shown in FIG. 2;

FIGS. 4A and 4B are elevational views of a locking piece used with the assembly of FIG. 2;

Figure 1A:
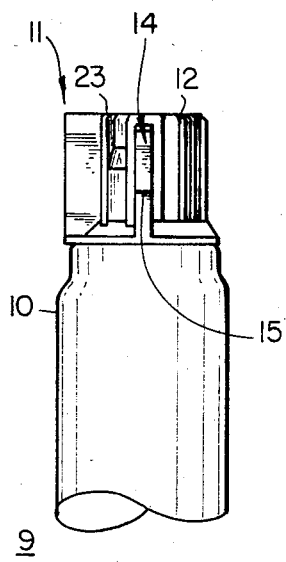
Figure 1B:
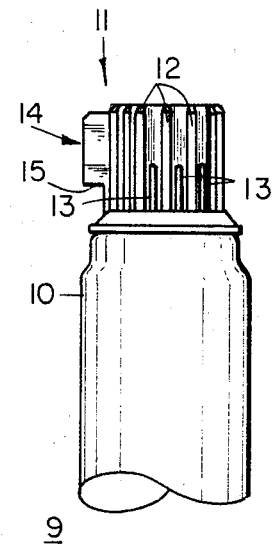

Referring to FIGS. 1A and 1B, there is shown a portion of a cathode ray tube 9, such as a television receiver kinescope, having a glass neck 10 and a tube base 11. The base 11 may be formed of plastic or similar material and incorporates a plurality of ribs 12 which physically separate the electrical terminals 13 of cathode ray tube 9. The tube base 11 also incorporates a guide member 14 which extends parallel to the longitudinal axis of the cathode ray tube. Guide member 14 is formed to have a surface 15 which faces the front portion of cathode ray tube 9 and extends substantially perpendicular to the tube longitudinal axis.

FIG. 2 illustrates a circuit board 16 having a socket 17 mounted thereon. Circuit board 16 incorporates circuitry, represented generally by components 18a–18g, which illustratively provide drive signals to the cathodes of cathode ray tube 9 and other appropriate signals and voltages to the electron gun assembly (not shown) of cathode ray tube 9. Circuit board 16 is adapted to be mounted on tube 9 via socket 17. Socket 17 comprises a generally cylindrical wall structure 20. Mounted to the interior of wall structure 20 is a plurality of electrical terminals 21 which, when the circuit board and socket assembly are mounted on cathode ray tube 9, make electrical contact with terminals 13 such that the appropriate signals and voltages are applied to tube 9.

Figures 5, 6:
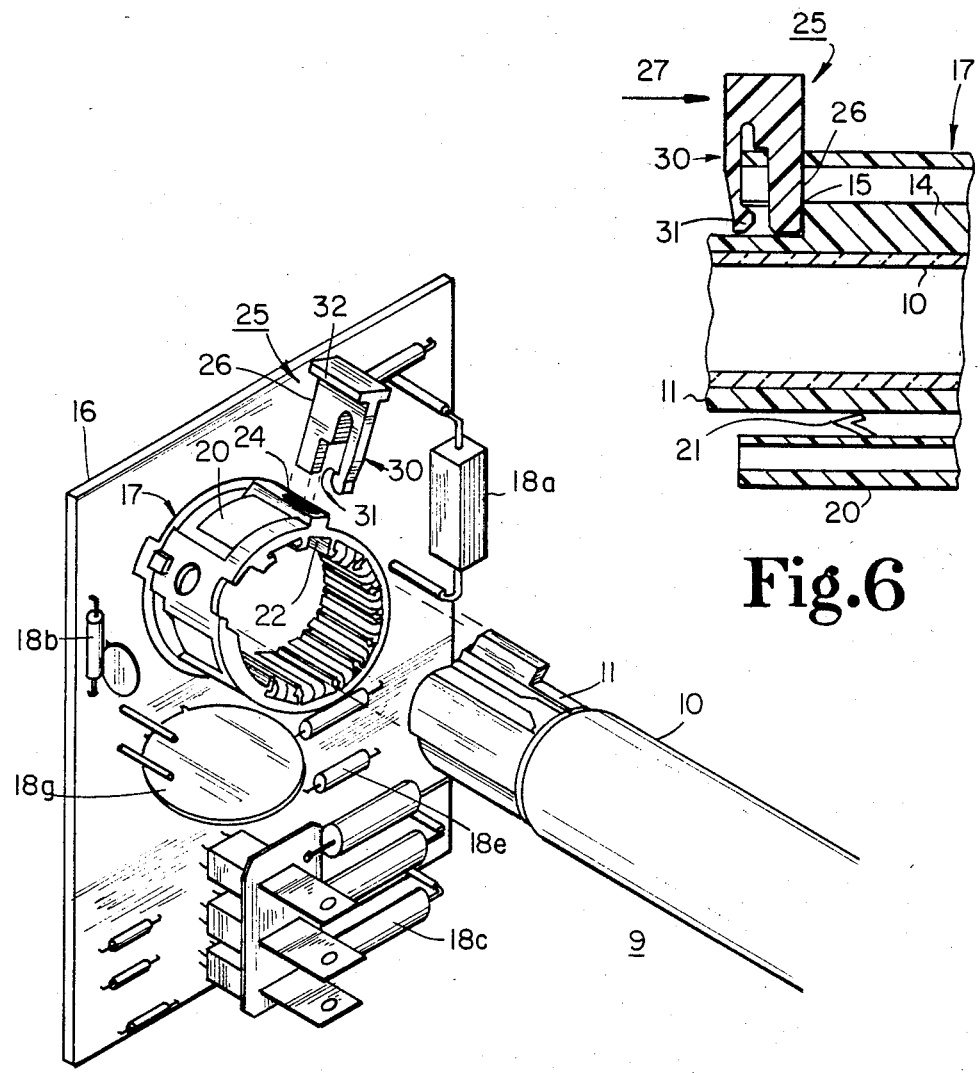
FIG. 5 is an exploded perspective view illustrating the orientation of components of the circuit board mounting arrangement of the present invention.
FIG. 6 is an elevational cross-sectional view of a portion of the assembly of FIG. 5.

A portion of wall structure 20 of socket 17 forms a channel 22 which cooperates to receive guide member 14 on tube base 11 to cause socket 17 to be properly aligned with tube base 11. Socket 17, along with circuit board 16, is mounted on tube base 11 by placing socket 17 over the rear 23 of tube base 11 with guide member 14 and channel 22 aligned, and pushing socket 17 and circuit board 16 forward toward the front of cathode ray tube 9, as shown in FIG. 5.

As can be seen in FIG. 3, the portion of wall structure 20 of socket 17 adjacent channel 22 has a hole or passage 24 through it, which provides access for a portion of a locking member or piece 25, shown in FIGS. 4A and 4B.

Locking piece 25, formed of plastic or other flexible material, incorporates a first portion 26 which has a cross section of the general shape of passage 24. When the socket 17 and circuit board 16 are in place on the tube base 11 of cathode ray tube 9, the first portion 26 of locking piece 25 is inserted through passage 24. The contour of portion 26 is tapered somewhat to provide a wedge-like fit in passage 24. When locking piece 25 is in position, portion 26 will abut surface 15, as shown in FIG. 6, so that removal of socket 17 from tube base 11, requiring a movement illustrated by arrow 27 in FIG. 6, is prevented.

Figure 7:
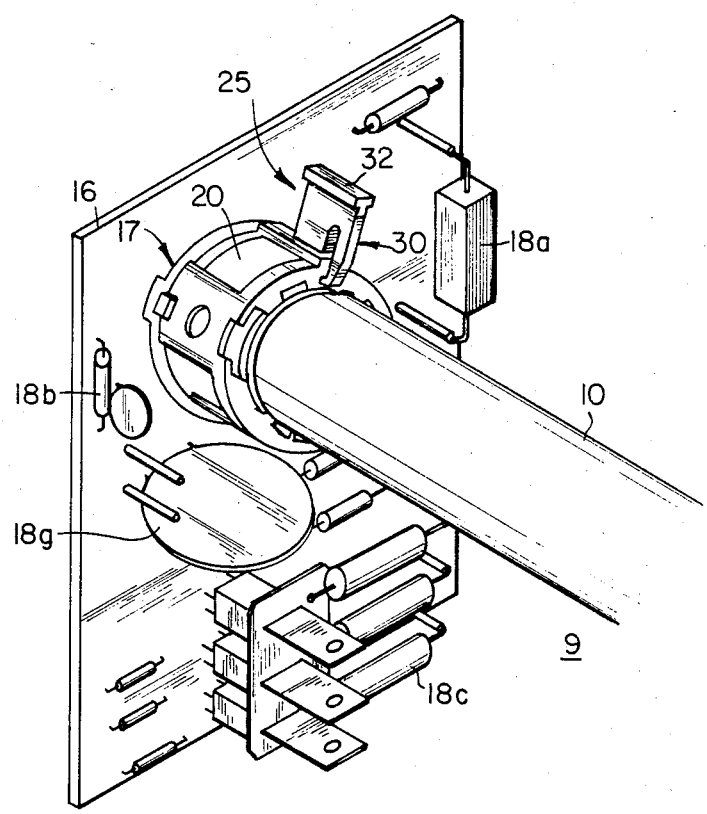
FIG. 7 is a perspective view illustrating the mounting arrangement of the present invention.

Locking piece 25 also incorporates a second portion 30 which has a hook 31 formed at its end. When locking piece 25 is in position, as shown in FIG. 6, hook 31 of second portion 30 will extend or snap under the front edge of wall structure 20 of socket 17 so that a portion of hook 31 will come in contact with the interior surface of wall structure 20 when removal of locking piece 25 is attempted. This positive latching of locking piece 25 to socket 17 will prevent the inadvertent removal or dislodging of locking piece 25 through vibration or movement during packing or shipping of the cathode ray tube or video display apparatus in which it may be mounted. Locking piece 25 ay still be easily removed if desired for service of the tube or circuit board by gripping and withdrawing locking piece 25 via finger grips 32. FIG. 5 illustrates the orientation of locking piece 25 with respect to socket 17 and tube base 11. FIG. 7 illustrates the completed assembly with circuit board 16 mounted on cathode ray tube 9. Locking piece 25 is also shown in place.

What is claimed is:

1. A mounting arrangement for a circuit board, comprising:

a cathode ray tube including a neck portion and having a tube base mounted to said neck portion, said tube base incorporating a guide member extending parallel to the longitudinal axis of said cathode ray tube from a point adjacent the end of said tube base remote from said neck portion to a point intermediate the two ends of said tube base, the surface of said guide member at said intermediate point extending substantially perpendicular to said longitudinal axis;

socket means, mounted on said circuit board, incorporating a generally cylindrical wall structure having inner and outer wall surfaces, a portion of said wall structure forming a channel therein for receiving said guide member to permit alignment of said socket means on said tube base, said portion of said wall structure having a passage extending between said inner and outer wall surfaces;

locking means having a first member insertable through said passage, said first member abutting said surface of said tube base guide means to prevent removal of said socket means from said tube base, said locking means having a second member abutting the end of said socket means wall structure remote from said neck portion and incorporating a hook for cooperating with the inner surface of said wall structure to prevent inadvertent removal of said locking means.

2. A mounting arrangement for a circuit board on a cathode ray tube, comprising:

a cathode ray tube including a neck portion having a tube base mounted to said neck portion and incorporating a guide member extending parallel to the longitudinal axis of said cathode ray tube from a point adjacent the end of said tube base remote from said neck portion to a point intermediate the two ends of said tube base, the surface of said guide member at said intermediate point extending substantially perpendicular to said longitudinal axis;

a socket, mounted on said circuit board, incorporating a generally cylindrical wall structure having inner and outer wall surfaces, a portion of said wall structure forming a channel therein for receiving said guide member to permit alignment of said socket on said tube base, said portion of said wall structure having a passage extending between said inner and outer wall surfaces; and locking means inserted through said passage in the wall structure of said socket for abutting said surface of said guide member to prevent removal of said socket from said tube base.

3. The arrangement defined in claim 2, wherein said locking means comprises self-retaining means for preventing inadvertent removal of said locking means.

4. The arrangement defined in claim 3, wherein said self-retaining means comprises a hook for cooperating with said socket.

5. The arrangement defined in claim 2, wherein said locking means comprises a tapered member for increasing the frictional cooperation between said tapered member and said passage.

6. The arrangement defined in claim 2, wherein said locking means includes a grip for aiding in the removal of said locking means.

* * * * *